United States Patent [19]

Spacer

[11] Patent Number: 4,765,144
[45] Date of Patent: Aug. 23, 1988

[54] SOLAR-POWERED RANKINE CYCLE PUMPING ENGINE

[76] Inventor: John P. Spacer, P.O. Box 127, Sandia Park, N. Mex. 87047

[21] Appl. No.: 133,025

[22] Filed: Dec. 15, 1987

Related U.S. Application Data

[63] Continuation-in-part of Ser. No. 818,359, Jan. 13, 1986, Pat. No. 4,720,978.

[51] Int. Cl.[4] .............................................. F01K 9/02
[52] U.S. Cl. .................................... 60/692; 60/641.8; 60/660; 417/379
[58] Field of Search ....................... 60/641.8, 651, 645, 60/646, 657, 660, 662, 670, 671, 685, 691, 692; 417/379, 383, 385, 386, 387, 388, 404

[56] References Cited

U.S. PATENT DOCUMENTS

| | | | |
|---|---|---|---|
| 659,450 | 10/1900 | McHenry | 60/641.8 |
| 3,901,036 | 8/1975 | Martin | 60/641 |
| 4,018,581 | 4/1977 | Ruff et al. | 62/2 |
| 4,068,476 | 1/1978 | Kelsey | 60/671 |
| 4,192,144 | 3/1980 | Pierce | 60/641 |
| 4,423,599 | 1/1984 | Veale | 60/641.8 |
| 4,655,691 | 4/1987 | Wakao | 417/379 X |
| 4,720,978 | 1/1988 | Spacer | 60/641.8 |

Primary Examiner—Stephen F. Husar

[57] ABSTRACT

The invention is a solar-powered, Rankine cycle, two fluid engine useable for many functions, especially for pumping liquids from the ground such as water or oil in remote locations. The engine driven by heat energy collected in standard collectors or in solar ponds utilizes a heated fluid such as water to transfer the heat from the collectors to a tank where a volatile working medium is transformed into a pressurized vapor. The heated working medium is then fed to a double acting cylinder where work is extracted from the working medium. The engine's valving is controlled by electric switches. The storage batteries are continuously charged by solar energy. If the source of energy is heat collected by standard collectors, a tracking device for the collectors, also driven by solar power, is incorporated in order to attain high collection efficiencies. The engine is used to drive either mechanical or hydraulic pumping devices. The invention is especially suited to remote locations, and for those purposes where constant vigil of the engine is impractical. The engine and the accessories are self-sufficient in that they require little or no maintenance, and are not dependent on a fuel or electricity supply.

10 Claims, 5 Drawing Sheets

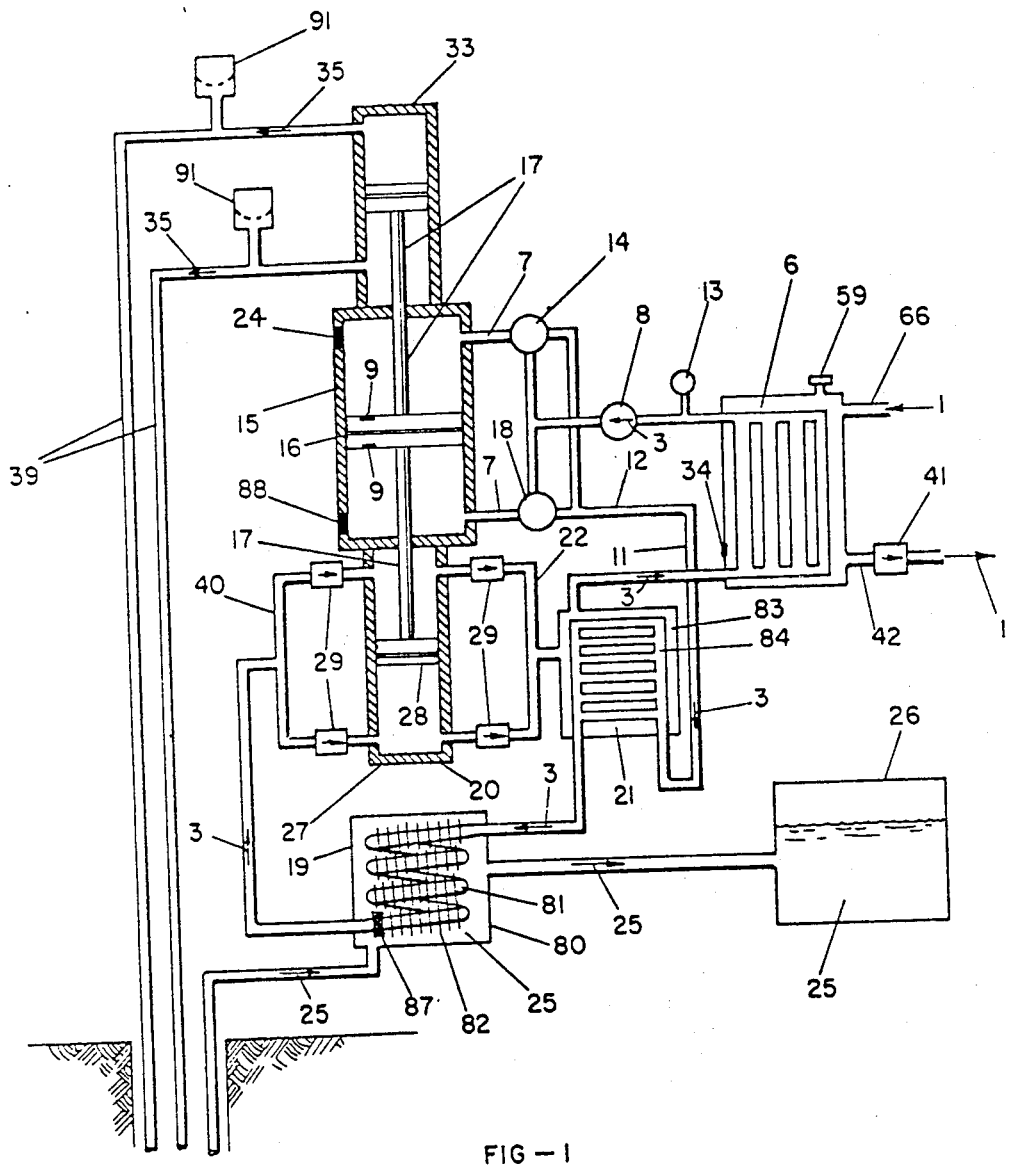
FIG—1
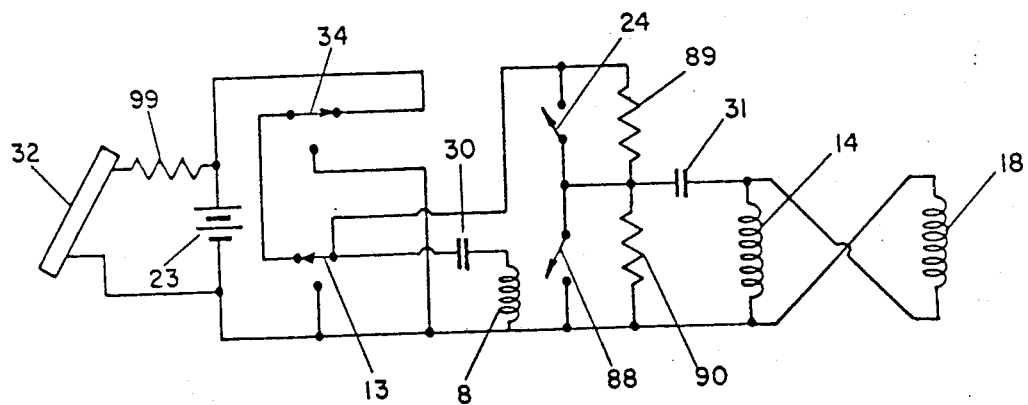
FIG—2

FIG—7

SOLAR-POWERED RANKINE CYCLE PUMPING ENGINE

CROSS-REFERENCE TO A RELATED APPLICATION

This application is a continuation-in-part application of U S. patent application Ser. No. 818,359, entitled "SOLAR-POWERED RANKINE CYCLE PUMPING ENGINE," filed on Jan. 13, 1986, now U.S. Pat. No. 4,720, 978, the teachings of which are incorporated herein by reference.

SUMMARY

In the southwestern part of the United States and in many parts of the world, pumping liquids such as water or oil from the ground is necessary at remote locations, or must be accomplished under conditions which, as a practical matter, preclude constant maintenance and vigil over the pumping engine. The invention is a virtually self-sustaining, reliable pumping engine which is not dependent on a fuel supply, nor a constant source of electricity. On the cattle ranges of the southwest, and on many remote farms, water must be pumped for livestock and for irrigation from wells a long distance from available power lines. This means that the farmer or rancher must put in expensive power lines, haul fuel, and constantly check the system for proper operation. It is therefore an objective of the invention to provide a reliable, dependable, self-sufficient pumping engine which needs virtually no maintenance, is not dependent on an outside supply of energy, and which is virtually automatic. It is also an objective that the invention be adaptable to a variety of uses such as pumping water or oil, irrigating, or filling stock tanks.

BACKGROUND

1. Field of the Invention

This invention relates generally to solar powered engines, and particularly to liquid pumping self-sufficient engines driven by solar energy.

2. Brief Description of the Prior Art.

One of the most familiar methods of pumping liquids, especially water from the ground in remote places, has been the windmill. However, the vagaries of the wind, and the common mechanical failures have rendered the windmill less than desirable. Gasoline powered engines, and electric motors have been found to be much more dependable, have high production rates, and require only small maintenance. However, both the gasoline or diesel engines, and electric motors are tied by an umbilical to their source of energy. Electric motors must have power lines or large banks of batteries which must be replaced with recharged batteries. Gasoline and diesel engines must be fed the fuel either through long fuel lines or from tank trucks. There has been a great deal of development in solar powered devices, especially to reduce dependence on electric power and hydrocarbon fuels. Solar powered engines can generally be divided into two classes: those using one fluid to both absorb the heat from the sun, and to then drive some sort of mechanical device, and those that use one fluid to collect the heat from the sun, and another fluid to drive the mechanical device. The present invention uses a two fluid system, and the numerous patents using one fluid systems are not particularly relevant. McHenry, U.S. Pat. No. 659,450 teaches the basics of a two fluid system of converting solar energy to mechanical work. Martin, U.S. Pat. No. 3,901,036 teaches a two fluid boiler, and Ruff, et al., U.S. Pat. No. 4,018,581 teaches a two fluid single acting piston device with a crankshaft and cam driven valves which operates a slave compression piston. Robinson, U.S. Pat. No. 4,009,587 teaches a hybrid device which uses only one fluid, but has two functional loops and a free piston. Swartzman, U.S. Pat. No. 4,084,379 also teaches a two fluid system where the two fluids are mixed and then separated.

BRIEF DESCRIPTION OF THE DRAWINGS

FIG. 1 is a schematic diagram of the engine.

FIG. 2 is a diagram of the electrical circuitry.

DESCRIPTION OF THE PREFERRED EMBODIMENT

Figure 3:
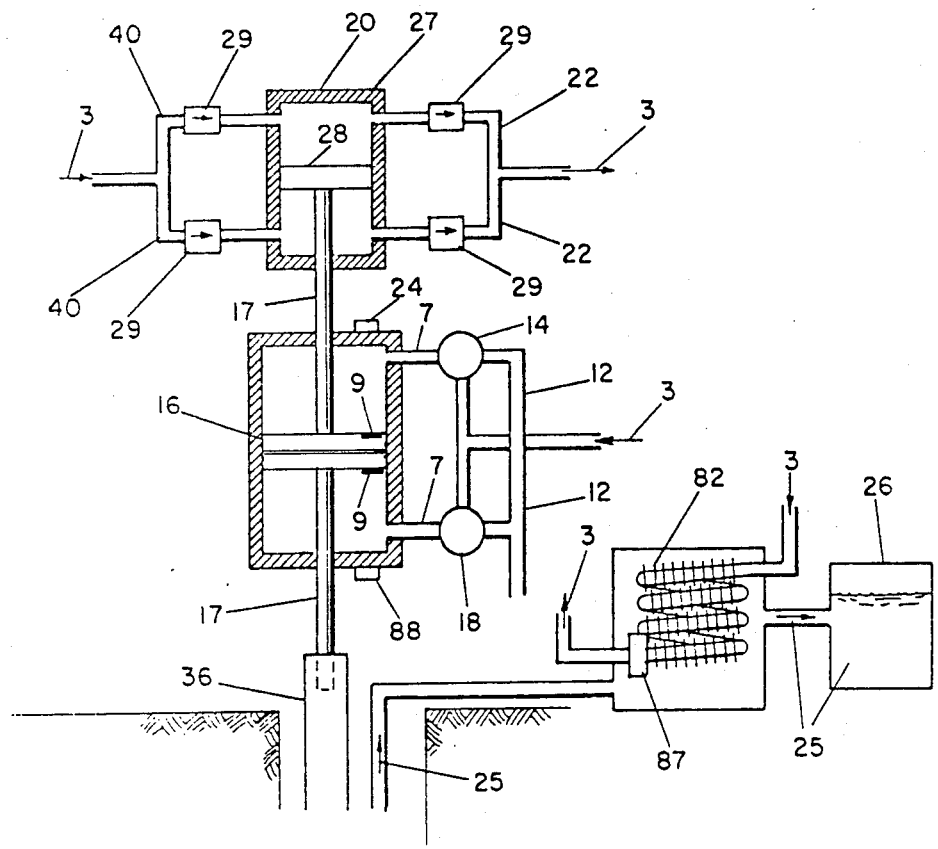
FIG. 3 is an abbreviated depiction of the engine, with a sucker rod attached.

FIG. 1 shows a first major component of the invention to be a Rankine cycle solar powered heat engine. A working medium 3 which has been heated, vaporized, and is under pressure passes a pressure switch 13, a two-way pressure valve 8, then to two threeway valves 14 and 18, three-way valve 14 being designated the top three-way valve because it controls the inlet and exhaust of the medium 3 to the top of a cylinder 15, and the three-way valve 18 being designated the bottom three-way valve for a similar reason. The working medium 3 is a volatile fluid whose boiling point is relatively low compared to a heated fluid 1 from which the working fluid 3 gets its energy. From the two three-way valves 14 and !8, the working medium 3 is passed alternately through inlet lines 7 into the selected ends of the cylinder 15 where the working medium 3 does work while expanding against a double acting piston 16. While the working medium 3 is doing work against one side of the double acting piston 16, the double acting piston 16 is exhausting working fluid 3 from the other end of the cylinder 15. The exhausted working medium 3 passes sequentially out through the three-way valves 14 and 18, through a heat exchanger 21 and into a condenser 19. The heat exchanger 21 consists of a sealed chamber 83 which has therein a bundle of tubes 84. Liquid working medium 3 is circulated through the sealed chamber 83, and hot exhausted vaporized working medium 3 from line 12 is passed through the bundle of tubes 84. The condenser 19 consists of a sealed container 80 having therein a condenser coil 81 and an accumulator 87, and the condenser coil 81 having cooling fins 82. A cold liquid 25 is circulated through the container 80 while vaporized working medium 3 is passed through the condenser coil 81. In the heat exchanger 21 the exhausted working medium 3 is passed through the condenser coil 81. In the heat exchanger 21 the exhausted working medium 3 loses some of its heat, and in the condenser 19 the exhausted working medium 3 loses more of its heat and is condensed to a liquid phase. The liquid working medium 3 then passes through a circulating pump 20 and is pumped again through the heat exchanger 21 where it is pre-heated in the liquid phase before being passed to a heat transfer means 6 where it is again heated, vaporized and pressurized for its next cycle through the engine. The main purpose of the pressure switch 13 is to detect an excessively low pressure. If the pressure is too low, the pressure switch 13 electrically closes the two-way pressure valve 8 thereby preventing the circulation of the pressurized working medium 3, stopping the engine and allowing the heat source 6 to sufficiently heat the working medium 3. When the pressure reaches a predetermined level, the pressure switch 13 opens the two-way pressure valve 8 and the working fluid 3 again resumes its circulation through the engine. The shut-off pressure will always be set lower than the restart pressure to prevent the cylinder 15 from becoming filled with liquid working medium 3 if the engine should stall because of insufficient working pressure. Because it is possible for the heated fluid 1 to be hot in the top of the heat transfer means 6, and cold at the bottom, an initial pressure may be sufficient to cause the pressure switch 13 to open the two-way pressure valve 8 when in fact there is insufficient energy available in the heat transfer means 6 to sustain the operation of the engine. To preclude this premature starting condition, a thermostat 34 is placed to sense the temperature of the heated fluid 1 at the bottom of the heat transfer means 6. This thermostat 34 is connected in series with the pressure switch 13 and the two-way pressure valve 8 so that the working medium is prevented from flowing until both the pressure of the working medium 3 and temperature of the heated fluid 1 indicate that working conditions exist. The pressure switch 13 is an electric switch through which an electric current flows from a rechargeable storage battery supply 23 as shown in FIG. 2. Because a nonrechargeable battery supply 23 will require replacing when the battery is discharged, a solar trickle charger 32 is connected to the rechargeable storage battery supply 23 in order to maintain the battery supply 23 at peak charge. The pressure switch 13 is a single pole, double throw switch. The three-way valves 14 and 18 are also electrically operated valves which are energized by the storage battery supply 23. The three-way valves 14 and 18 are actuated to the proper state by two reed switches 24 and 88. One of the reed switches 24 or 88 is placed at each end of the travel of a piston rod 17 which is connected to the piston 16 and runs through each end of the cylinder 15. The reed switch 24 is designated the top reed switch because it is so positioned that it senses when the piston 16 has reached the top of the cylinder 15. In a similar manner, the bottom reed switch 88 senses when the piston 16 has reached the bottom of the cylinder 15. The reed magnetic switches 24 and 88 can be any type commercially available. It has been found that magnetically actuated reed switches 24 and 88 have long life, are durable, and require virtually no maintenance. Furthermore, the use of magnetic reed switches 24 and 88 permit direct sensing of the position of the piston 16, without any additional openings in the cylinder 15 which would require sealing and maintaining. When the reed switch 24 senses that the piston 16 has reached the end of its travel toward the top of the cylinder 15 because of the influence of a magnet 9 in the piston 16, an electrical signal is sent to the top three-way valve 14 to divert the pressurized working medium 3 to the top of the cylinder 15, and the electrical signal is also sent to the bottom three-way valve 18 to exhaust the spent working medium 3 from the bottom of the cylinder 15. Similarly, when the bottom reed switch 88 senses that the piston 16 has reached the end of its travel towards the bottom of the cylinder 15 because of the influence of another magnet 9 in the piston 16, an electrical signal is sent to the bottom three-way valve 18 to admit pressurized working medium into the bottom of the cylinder 15, and an electrical signal is also sent to the top three-way valve 14 to exhaust the spent working medium from the top of the cylinder 15. At the end of each stroke of the piston 16, the positions of the three-way valves 14 and 18 are changed so that the just exhausted end of the cylinder 15 receives fresh pressurized working medium 3 while the now expanded end of the cylinder 15 is permitted to be exhausted. The working medium 3 passes from the heat transfer means 6 past the pressure switch 13, through the pressure valve 8, through one of the three-way valves 14 or 18, into one end of the cylinder 15, then is exhausted through the same three-way valve, 14 or 18, through the heat exchanger 21, through the condenser 19, through the circulating pump 20, again through the heat exchanger 21, and back to the heat transfer means 6 having completed a loop, designated the working loop 11. In order to remove heat from the working medium 3 in the condenser 19, the cold liquid 25 is required. Since the invention is designed to pump liquids from the ground, a source of cold liquids 25 is readily available from the liquids pumped. Thus, the cold liquid 25 will be water or oil pumped from the ground which is relatively cold. The cold liquid 25 will be circulated through the condenser 19 before it is sent to a storage facility 26. When the cold liquid 25 is water, and is used for stock watering, the storage facility 26 may well be a stock watering tank, and the heat added to the cold liquid 25 will aid against freezing in the stock watering tank during winter.

The circulating pump 20 is shown in FIG. 1 to be a double acting cylinder 27 around the piston rod 17 having another piston, a pump piston 28, attached thereto. Four check valves 29 in the two inlet lines 40 and in the two outlet lines 22 insure the proper flow of the working medium through the working loop 11.

FIG. 2 shows the diagram of the electrical circuitry for the engine. The three-way valves 14 and 18 and the pressure valve 8 are electrically actuated and are shown as their actuating coils, respectively numbered. The reed switches 24 and 88 detect the position of the piston 16 or the piston rod 17, and send electrical pulses to the actuating coils 14 and 18 which activate the valves 14 and 18 to the desired state. The coils of the three-way valves 14 and 18 are shown inverted to each other electrically to indicate that when one valve, 14 or 18, is open, the other is closed. Shown across the two reed switches 24 and 88, are two resistors 89 and 90 which form a voltage divider, and from in between the resistors 89 and 90, a capacitor 31 is placed which connects to the mid-point of the thus formed voltage divider and to one end of each of the coils of the three-way valves 14 and 18. The purpose of the voltage divider arrangement is to provide a constant twelve volts for the capacitor 31 from the twenty-four volt power supply 23. Thus, when the piston 16 reaches a limit in its travel, reed switch 24 momentarily closes, and a pulse of power is applied to the capacitor 31 which charges through the coils of the three-way valves 14 and 18. When the piston 16 reaches its other limit of travel, reed switch 88 momentarily closes which charges the capacitor 31 through the coils of the three-way valves 14 and 18, resetting the three-way valves. A solar panel trickle charger 32 is constantly charging the power supply 23 through a current limiting resistor 99. It is to be noted that one end of the resistors 89 and 90 is connected to the pressure switch 13 and there will be no current drain on the power supply 23 until both the thermostat 34 and the pressure switch 13 are closed. Furthermore, both the thermostat 34 and the pressure switch 13 must be in their closed positions before the pressure valve 8 is actuated by a charge of capacitor 30 to the open position. Therefore, the trickle charger 32 will be charging the power supply 23 at all times when the engine is not running, and also when the engine is running, but there will be no current drain while the engine is not running.

There are several ways to convert the motion of the piston rod 17 to useful work. One method is shown in FIG. 1 where a hydraulic pump 33 is connected to the piston rod 17. The hydraulic pump 33 operates in a fashion similar to the circulating pump 20 and pumps hydraulic fluid 35 through hydraulic lines 39. The hydraulic lines 39 can carry the pressurized hydraulic fluid 35 or other fluids to any device, particularly down a well to a hydraulic down-the-well pump, not shown. Another method of extracting useful work from the engine is to directly connect the engine to a sucker rod 36 as seen in FIG. 3. In this embodiment, the piston rod 17 can be connected directly with the sucker rod 36, and the whole engine mounted over the well, as shown in FIG. 3. In this configuration, the hydraulic pump 33 is not needed.

Figure 4:
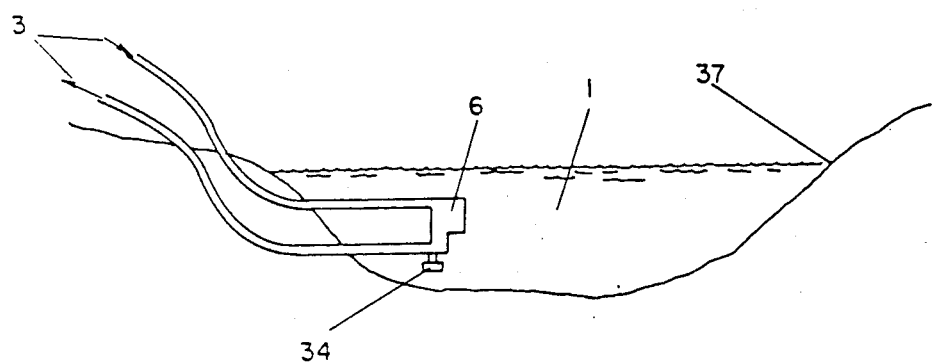
FIG. 4 is a depiction of a solar pond as a solar collector.
Figure 5:
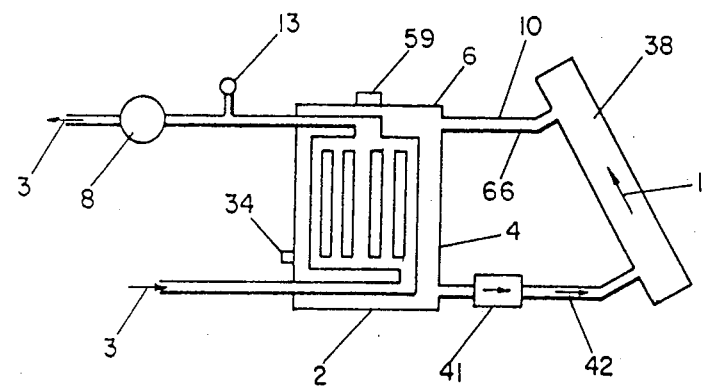
FIG. 5 is a depiction of standard collectors and a boiler.

The heat source for the engine has been aforestated to be solar energy. For remote sites, solar ponds 37 collect and store the sun's energy in the fluid of the solar pond 37, and the heated fluid of the solar pond 37 becomes the heated fluid 1. As shown in FIG. 4, the working fluid 3 is circulated through heat transfer means 6 immersed within the heated fluid 1 of the solar pond 37 where the working fluid 3 is vaporized and pressurized and circulated to the engine. In this configuration, the thermostat 34 would be situated to sense the temperature of the heated fluid 1 in the solar pond. FIG. 5 shows the solar energy being collected by standard collectors 38. The heated fluid 1 is circulated through the collectors 38 by thermal syphoning controlled by a check valve 41 in a return line 42. The heated fluid 1 passes from the top of the collectors 38 to a tank 4 through a line 66. The heat transfer means 6 is comprised of the tank 4 in which the heated fluid 1 is circulated, and a series of tubes through which the working medium 3 is circulated. The operating temperature of the heat transfer means 6, especially if the heated fluid 1 is water, can be increased by pressurizing the tank 4 with compressed air on the top of the tank 4 to prevent boiling of the heated fluid 1. The tank 4 has a filler cap 59 into which additional fluid 1 may be introduced if necessary. The tubes which carry the working fluid 3 discharge the working fluid 3 in a vaporized state past the pressure switch 13, through the pressure valve 8, through the three-way valves 14 and 18 and into the engine of FIG. 1 or 3. If the pressure of the working medium 3 is not sufficient, the pressure switch 13 closes the pressure valve 8 until such time as the pressure of the working medium 3 is sufficient. If the temperature of the heated fluid 1 is insufficient, the thermostat 34 will function to close the two-way pressure valve 8 in a similar fashion. The circuit through which the heated fluid 1 passes, from collector 38 to tank 4 through the check valve 41 and back to the collector 38, is designated the heat loop 10.

While the solar powered heat engine works quite satisfactorily, two areas need addressing. First, the piston 16 in the cylinder 15 needs lubricating, as does piston 28. To accomplish this, oil is introduced into the working medium 3 before the working medium 3 is introduced into the cylinder 15. The oil is put into the working medium 3 in the heat transfer means 6, and the oil is entrained by the working medium 3 and transported into the cylinder 15 where the piston 16 is lubricated. Excess oil remains entrained and is exhausted with the working medium 3. To prevent an excess build-up of oil in the condenser, it is important that the exhausted working medium 3 have a downward path until it is reintroduced into the heat transfer means 6.

The second area of improvement concerns leakage of the working medium 3 around the piston rod 17. It has been found that a certain amount of working medium 3 sometimes is able to leak from the cylinder 15 around the seal to the piston rod 17 which protrudes forth from the cylinder 15 to operate the hydraulic pump 33. To solve this problem, the hydraulic pump 33 is made integral with the cylinder 15 and the hydraulic system is pressurized by accumulators 91 on both sides of the piston in the hydraulic pump 33. Thus, the minimum pressure on the hydraulic pump 33 is approximately the same as the maximum pressure inside the cylinder 15, and the working medium 3 in the cylinder 15 does not tend to leak out of cylinder 15 against an equal pressure.

Figure 6:
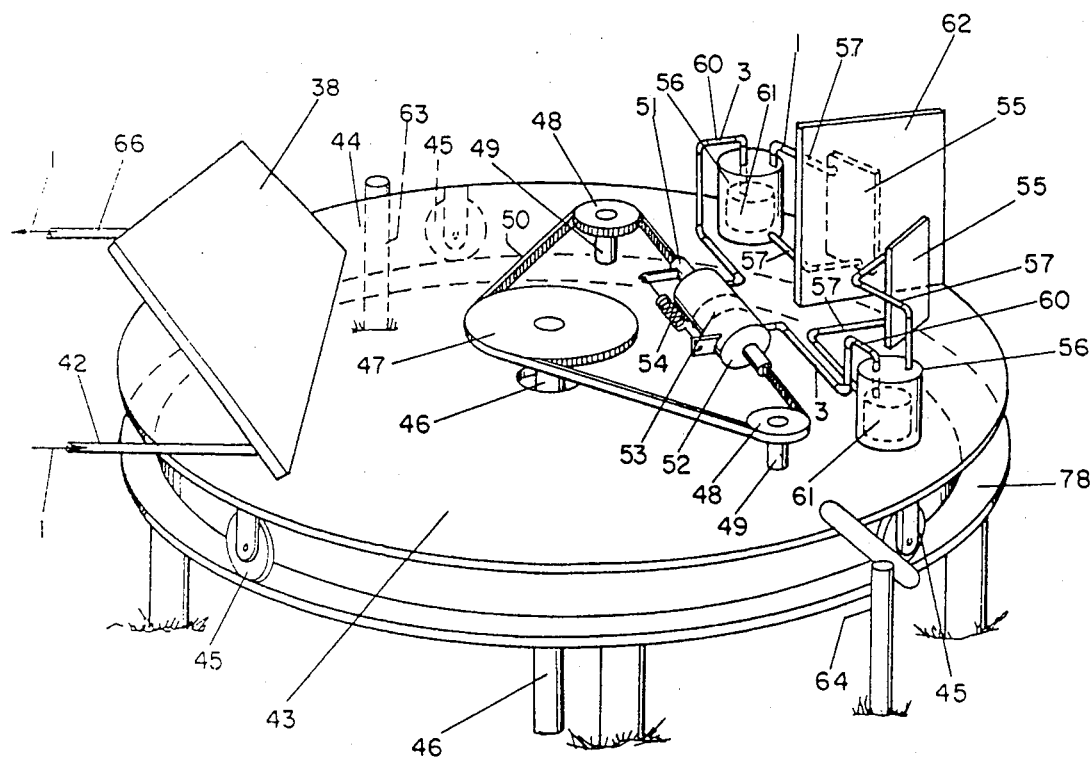
FIG. 6 is a depiction of the tracking device.

In order to increase the efficiency of the collectors 38, a tracking device 43 is necessary. The tracking device 43 should be self-controlling, self-propelling, and self-powered. FIG. 6 shows the tracking device 43 to have a platform 44 which has a plurality of wheels 45 canted so that the platform 44 will move in a circular path. In the center of the circular path of the wheels 45, is a center post 46 which protrudes vertically from the ground in which the center post 46 is anchored, said center post 46 having on its uppermost extremity, a rigidly affixed horizontal sprocket, designated the hub sprocket 47. Affixed to the platform 44 are two mounting posts 49 on each of which is mounted in a horizontal plane an idler sprocket 48. The mounting posts 49 are mounted radially from the center post 46 approximately halfway to the wheels 45, and the mounting posts 49 are separated by approximately ninety degrees. A chain 50 mates with the hub sprocket 47 and the idler sprockets 48 and is affixed at each end to a piston rod 51 between the idler sprockets 48. The piston rod 51 is connected fixedly to a piston 53 which slideably moves within a double acting cylinder 52. The cylinder 52 is fixedly mounted to the platform 44, and the cylinder 52 is connected and biased to the piston rod 51 by an east return spring 54. The tracking device 43 has two separate trarking collectors 55. Each of the tracking collectors 55 is connected by lines 57 to small boilers 56, thus forming loops through which heated fluid 1 circulates by thermal syphoning. In each small boiler 56 is an inner tank 61 which contains the working fluid 3. Each inner tank 61 is connected by a line 60 to a different end of the double acting cylinder 52. The tracking collectors 55 are mounted edge to edge, and separated by a shadow wall 62. The collectors 38 are also mounted on the platform 44 perpendicular to the shadow wall 62, and, thus, are aimed at the sun whenever the shadow wall 62 is aimed at the sun. The tracking collectors 55 may be in the same plane and parallel to the collectors 38, or may be positioned to form equal acute angles with the shadow wall 62 away from the sun, as shown. During the night, the pressure in the cylinder 52 is nearly atmospheric, and the east return spring 54 has moved the platform 44 so that the platform 44 rests against an east stop 63. As the sun rises, it begins to heat the tracking collector 55 nearest the sun, but the other tracking collector 55 is shaded by the shadow wall 62. The heat from the sun falling on the one tracking collector 55 heats the fluid 1 which, in turn, vaporizes and pressurizes the working medium 3, increasing the pressure in one end of the double acting cylinder 52, thus, the platform 44 is kept against the east stop 63. As the sun rises higher, the initially shaded tracking collector 55 is illuminated while the first illuminated tracking collector 55 begins to be shaded. The pressure in the other end of the double acting cylinder 52 soon exceeds the pressure in the first pressurized end of the double acting cylinder 52 and causes the cylinder 52 to move with respect to the piston rod 51 and consequently the platform 44 to move. As the sun moves from east to west, the platform also moves so that the shadow wall 62 is aimed at the sun and both tracking collectors 55 are illuminated equally. Finally, when the sun is setting, the platform 44 comes to rest against a west stop 64. As the pressures in the double acting cylinder 52 subside during the night, the east return spring 54 repositions the platform 44 against the east stop 63 so that the collectors 38 and the tracking collectors 55 are awaiting the next sunrise. As shown, the tracking device 43 discloses a two fluid system; however, the tracking device 43 could as well be a single fluid system.

It is contemplated that, for some applications, the engine may be mounted on the platform 44, and in other applications, the engine may be mounted on the ground while the collectors 38 are mounted on the platform 44. If the collectors 38 are mounted on the platform 44 and the engine is mounted on the ground, then the lines 42 and 66 will have to be flexible. In areas in which there is an appreciable amount of snowfall during the winter, the platform 44 must be elevated. Snow accumulations caused from normal snowfall or from snow which slides from the collectors 38 and 55 can prevent the canted wheels 45 from turning. This condition can be eliminated by placing a track 78 as shown in FIG. 6 above the ground for the wheels 45 to run on. Such a track 78 can be made of angle iron or cement, and should be elevated sufficiently so that snow accumulations do not interfere with the turning of the wheels 45.

In the foregoing, there is implied that the working medium 3 and the heated fluid 1 have certain characteristics. FREON TM, manufactured by E. I. duPont de Nemours Co. has several characteristics which make it especially useful as a working medium 3 and fortunately, water is an excellent heated fluid 1. FREON 114 is more desirable as a working medium 3 than is FREON 12 because its boiling point is higher and does not require extremely low temperatures to liquify, and the operating temperatures of the tank 4 and the small boilers 56 are not excessively high. The following table shows the properties and characteristics of FREON 114, FREON 12 for comparison, and water.

| ITEM | FREON 114 | FREON 12 | WATER |
|---|---|---|---|
| Chemical Formula | $CClF_2-CClF_2$ | $CCl_2F_2$ | $H_2O$ |
| Molecular Weight | 170.93 | 120.92 | 18.0 |
| Boiling Point [F.] (1 atm) | 38.78 | −21.62 | 212.0 |
| Liquid Density (77 F., $lb/ft^3$) | 90.91 | 81.84 | 62.3 |
| Vapor Density (boiling point) | 0.489 | 0.395 | 0.037 |
| Specific Heat [BTU/lb F.] | | | |
| Liquid (77 F., 1 atm) | 0.243 | 0.232 | 0.998 |
| Vapor (77 F., 1 atm) | 0.170 | 0.145 | 0.429 |
| Vaporization (b.p., 1 atm) | 58.53 | 71.04 | 970.3 |

Another area that requires special attention is the three-way valves, 14 and 18, and the two-way pressure valve 8. These valves should be relatively fast acting, and require little electrical power. The reed switches 24 and 88 must also be very reliable with excellent contact repeatability. The electric valves, three-way 14 and 18, and the two-way pressure valve 8, used in the invention have been found to be very reliable and dependable. Such valves are commercially available from Skinner Precision Industries, Inc. of New Britain, Conn. under the tradename of Magnelatch.

Figure 7:
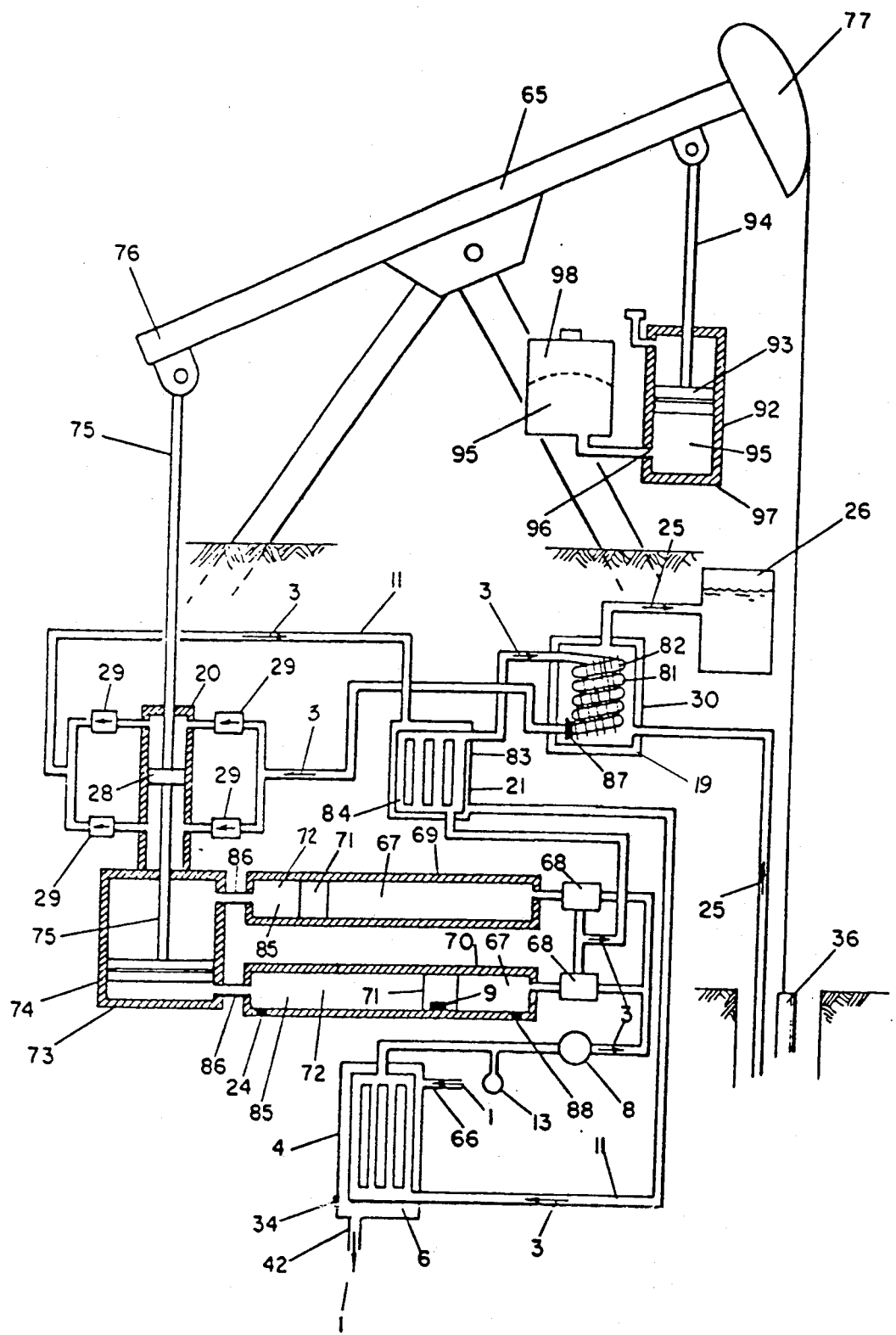
FIG. 7 is a depiction of the engine used with a pump jack to pump oil.
Figure 8:
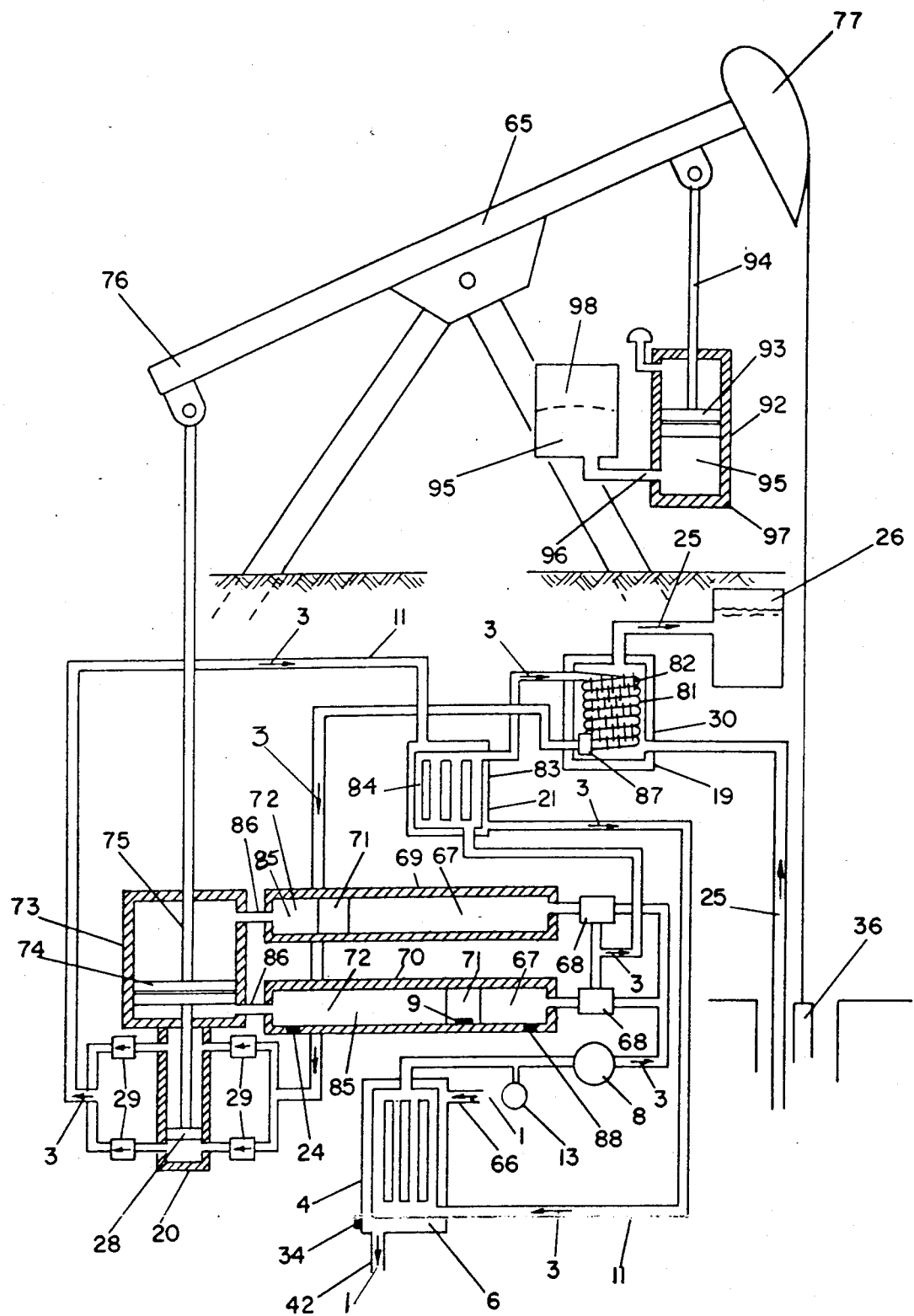
FIG. 8 depicts an alternative embodiment of the engine used with a pump jack to pump oil.

FIGS. 7 and 8 show embodiments of the invention adapted to drive pump jacks. In FIGS. 7 and 8, the invention is slightly modified and applied to a pump jack 65 used for pumping oil. The pump jack 65 has two ends, a driven end 76 and a head end 77, and is connected at the head end 77 to a sucker rod 36 in standard and known methods. As in the previous embodiment, the heated fluid 1 gains its heat from the sun via a solar pond 37 as shown in FIG. 4 or solar collectors 38 mounted, which are preferably on a tracking device 43 as shown in FIG. 6. The working medium 3 gets its heat from the heated fluid 1, and the working medium 3 is vaporized and pressurized. The working medium is then sent past a pressure switch 13, through a two-way pressure valve 8, and then through two three-way valves 68 and into two piston-type accumulators 69 and 70. Each piston-type accumulator, 69 and 70, has therein a free piston 71, which divides each piston-type accumulator, 69 and 70, into a gas end 67 and an oil or other lubricating fluid end 85. The working medium 3 is alternately inletted and exhausted from one gas end 67 of each piston-type accumulator 69 and 70, while oil 72 occupies the oil end 85 of each piston-type accumulator 69 and 70. The oil ends 85 of the piston-type accumulators 69 and 70 are connected by pressure lines 86 to either end of a double acting working cylinder 73. In the FIG. 7 embodiment, the working cylinder 73 has therein a piston 74 which is attached to a piston rod 75 extending from the piston 74 through one end of the working cylinder 73, through cylinder 20, and attaching in known and standard methods to the driven end 76 of the pump jack 65. In the FIG. 8 embodiment rod 75 passes entirely through cylinder 73 instead of cylinder 20. Since cylinder 73 contains only oil, the possibility of a freon leak from cylinder 20 into the atmosphere is essentially eliminated. The FIG. 8 embodiment otherwise operates in the same manner as the FIG. 7 embodiment. The working medium 3 is alternately inletted first to one gas end 67 of one piston-type accumulator, for example 69, and after the free piston 71 in cylinder 69 has been forced its full travel, oil 72 from the piston-type accumulator 69 has been forced into one end of the working cylinder 73 causing a corresponding movement of the piston 74 and the piston rod 75. While the oil 72 is being forced against one side of the piston 74, oil 72 is being forced out of the other side of the double acting working cylinder 73 back into the oil end 85 of piston-type accumulator 70, and the working medium 3 in piston-type accumulator 70 is exhausted. At full travel, reed switches 24 and 88 sense the travel and electrically switch the three-way valves 68 so that the working medium 3 now goes into the piston-type accumulator 70, initiating a similar function in piston-type accumulator 70 and a reverse motion to the piston rod 75. Thus, the oil 72 is trapped and only passes from its particular oil end 85 of one of the piston-type accumulators, 69 or 70, into its particular end of the working cylinder 73. When exhausted from one of the piston-type accumulators, 69 or 70, the working medium 3 passes through a heat exchanger 21, through a condenser 19, then through a circulating pump 20 and returns to receive heat from the heated fluid 1. The circulating pump 20 and its piston 28 and the condenser 19 are functionally the same as described in the previous embodiment. However, those skilled in the art will appreciate that in practicing the invention the circulating pump 20 may or may not be integral with the working cylinder 73. The electrical system is also functionally the same as previously described in the prior embodiment having a solar trickle charger 32, and capacitors 30 and 31. In this embodiment there are two reed switches 24 and 88 as in the previous embodiment; and one of these switches, 24 or 88, is positioned at each end of the piston-type accumulator 70, and is actuated by the magnet 9. By way of illustration only, the working cylinder 73 may be twelve inches in diameter and have a stroke of twenty-four inches, while the piston-type accumulators 69 and 70 may each have a diameter of six inches and a stroke of the free piston of ninety-six inches. Thus, there is a greater force acting on the piston 74, but through a shorter distance, and a smaller force acting through a greater distance on free pistons 71. In this second embodiment, it is to be understood that the solar energy may be collected in a solar pond 37 or in collectors 38, and the collectors 38, if used, may or may not be mounted on a tracking device 43, depending on the overall design and cost considerations for each individual installation. In the FIG. 8 embodiment, rod 75 passes entirely through cylinder 73 instead of cylinder 20. The FIG. 8 embodiment otherwise operates in the same manner as the FIG. 7 embodiment.

Because this solar powered heat engine is designed as shown to be connected directly and in a vertical manner to the driven end 76 of the pump jack 65, a counterbalance must be designed to offset the forces caused by the stopping and lifting of the heavy weight of the sucker rod 36. In conventional engines used currently with pump jacks 65, the engine drives a counterweight around an axle so that as the sucker rod 36 is lowered, the counterweight is lifted, and conversely as the counterweight is lowered, the sucker rod 36 is raised. To perform the same function as the counterweight, the invention herein utilizes a hydraulic accumulator system 97 which is shown to be comprised of a compression cylinder 92 having therein a piston 93 which is connected to the pump jack 65 adjacent to the head end 77 by a compression rod 94; and the compression cylinder 92 is filled with oil 95 so that when the head end 77 descends toward the surface of the ground, the compression rod 94 forces the piston 93 down the cylinder 92 forcing the oil 95 out an orifice 96 and into a pressurized accumulator 98, and when the head end 77 of the pump jack 65 rises, lifting the sucker rod 36, the pressurized accumulator 98 forces the oil 95 back into the compression cylinder 92 and forces the piston 93 and the compression rod 94 upward, thus assisting the head end 77 to raise the sucker rod 36.

I claim:

1. A heat engine comprising:
   (a) a source of heating fluid;
   (b) a two phase working fluid;
   (c) a first heat exchanger for heating said working fluid with energy from said heating fluid;
   (d) first double acting cylinder means comprising opposing ends, and a piston which reciprocates within said cylinder means between said ends, said piston being affixed to a piston rod which extends through one of said ends;
   (e) a pair of hydraulic cylinders, each having a free piston between a working fluid containing end and a lubricating fluid containing end, said lubricating fluid containing end of each of said hydraulic cylinders being connected to a separate one of said opposing ends of said first cylinder means, said lubricating fluid containing ends and said first cylinder means being filled with and sharing a common lubricating fluid;
   (f) means for doing work operably connected to said piston rod;
   (g) means connected to said first exchanger for passing only working fluid above a predetermined pressure and temperature;
   (h) a pair of three-way valves positioned between said hydraulic cylinders and said working fluid passing means, and between said hydraulic cylinders and a second heat exchanger, each of said valves connecting one of said working fluid ends of one of said hydraulic cylinders to said fluid passing means for conducting pressurized working fluid from said first heat exchanger to said hydraulic cylinder end, and to said second heat exchanger for exhausting said working fluid from said hydraulic cylinder end through said second heat exchanger;
   (i) condenser means;
   (j) second double acting cylinder circulating pump means for pumping said working fluid through a working loop, said circulating pump means containing a piston connected to said piston rod of said first cylinder means, said second circulating pump means having ends containing working fluid inlet and outlet check valves beyond piston travel, said circulating pump means being disposed for pumping working fluid through said working loop from said condenser means, through said second circulating pump means, through said second heat exchanger, said first heat exchanger, said pressure and temperature sensitive fluid passing means and said three-way valves, into said working fluid ends of said hydraulic cylinders, back through said three-way valves, through said second heat exchanger and back into said condenser means; and
   (k) means for operating said three-way valves to control working fluid entry into and exit from said working fluid ends of said hydraulic cylinders to cause said heat engine to do work.

2. The invention of claim 1 wherein said means for doing work comprises means for running a pump jack.

3. The invention of claim 1 wherein said three-way valve operating means comprises electrical switching means for sensing piston travel in said hydraulic cylinders and for controlling working fluid entry and exit from said hydraulic cylinders in accordance therewith.

4. The invention of claim 1 wherein said first double acting cylinder means is a relatively short stroke and large bore cylinder means, containing a relatively large diameter piston, and said pair of hydraulic cylinders are relatively long stroke, small bore cylinders containing relatively small diameter free pistons to provide a mechanical advantage.

5. The invention of claim 1 wherein said piston rod passes through both ends of said second double acting cylinder circulating pump means.

6. A heat engine comprising:
(a) a source of heating fluid;
(b) a two phase working fluid;
(c) a first heat exchanger for heating said working fluid with energy from said heating fluid;
(d) first double acting cylinder means comprising opposing ends, and a piston which reciprocates within said cylinder means between said ends, said piston being affixed to a piston rod which extends through both said ends;
(e) a pair of hydraulic cylinders, each having a free piston between a working fluid containing end and a lubricating fluid containing end, said lubricating fluid containing end of each of said hydraulic cylinders being connected to a separate one of said opposing ends of said first cylinder means, said lubricating fluid containing ends and said first cylinder means being filled with and sharing a common lubricating fluid;
(f) means for doing work operably connected to said piston rod;
(g) means connected to said first exchanger for passing only working fluid above a predetermined pressure and temperature;
(h) a pair of three-way valves positioned between said hydraulic cylinders and said working fluid passing means, and between said hydraulic cylinders and a second heat exchanger, each of said valves connecting one of said working fluid ends of one of said hydraulic cylinders to said fluid passing means for conducting pressurized working fluid from said first heat exchanger to said hydraulic cylinder end, and to said second heat exchanger for exhausting said working fluid from said hydraulic cylinder end through said second heat exchanger;
(i) condenser means;
(j) second double acting cylinder circulating pump means for pumping said working fluid through a working loop, said circulating pump means comprising opposing ends and containing a piston connected through one of said ends to said piston rod of said first cylinder means, said second circulating pump means ends containing working fluid inlet and outlet check valves beyond piston travel, said circulating pump means being disposed for pumping working fluid through said working loop from said condenser means, through said second circulating pump means, through said second heat exchanger, said first heat exchanger, said pressure and temperature sensitive fluid passing means and said three-way valves, into said working fluid ends of said hydraulic cylinders, back through said three-way valves, through said second heat exchanger and back into said condenser means; and
(k) means for operating said three-way valves to control working fluid entry into and exit from said working fluid ends of said hydraulic cylinders to cause said heat engine to do work.

7. The invention of claim 6 wherein said one end of said second double acting cylinder circulating pump means through which said piston rod passes is contiguous to one end of said first double acting cylinder means, thereby hermetically sealing said second double acting cylinder circulating pump means from said environment.

8. The invention of claim 6 wherein said means for doing work comprises means for running a pump jack.

9. The invention of claim 6 wherein said three-way valve operating means comprises electrical switching means for sensing piston travel in said hydraulic cylinders and for controlling working fluid entry and exit from said hydraulic cylinders in accordance therewith.

10. The invention of claim 6 wherein said first double acting cylinder means is a relatively short stroke and large bore cylinder means, containing a relatively large diameter piston, and said pair of hydraulic cylinders are relatively long stroke, small bore cylinders containing relatively small diameter free pistons to provide a mechanical advantage.

* * * * *

UNITED STATES PATENT AND TRADEMARK OFFICE
CERTIFICATE OF CORRECTION

PATENT NO. : 4,765,144
DATED : August 23, 1988
INVENTOR(S) : John P. Spacer

It is certified that error appears in the above-identified patent and that said Letters Patent is hereby corrected as shown below:

In the Specification:

In Column 2, at line 33, change "threeway" to --three-way--.

In Column 2, at line 42, change "!8" to --18--.

In Column 4, at line 68, change "charges" to --discharges--.

In Column 6, at line 56, change "trarking" to --tracking--.

Signed and Sealed this

Seventh Day of February, 1989

Attest:

DONALD J. QUIGG

*Attesting Officer*  *Commissioner of Patents and Trademarks*